United States Patent
Reneau et al.

(10) Patent No.: US 11,208,829 B2
(45) Date of Patent: Dec. 28, 2021

(54) PIVOT CONNECTOR

(71) Applicants: Lee L. Reneau, Conroe, TX (US); Phillip Lawson, Conroe, TX (US)

(72) Inventors: Lee L. Reneau, Conroe, TX (US); Phillip Lawson, Conroe, TX (US)

(73) Assignee: XcelTek LLC, Conroe, TX (US)

( * ) Notice: Subject to any disclaimer, the term of this patent is extended or adjusted under 35 U.S.C. 154(b) by 923 days.

(21) Appl. No.: 15/858,814

(22) Filed: Dec. 29, 2017

(65) Prior Publication Data
US 2018/0119446 A1    May 3, 2018

(51) Int. Cl.
*E04H 17/06* (2006.01)
*F16C 11/04* (2006.01)

(52) U.S. Cl.
CPC .............. *E04H 17/06* (2013.01); *F16C 11/04* (2013.01)

(58) Field of Classification Search
CPC ....... E04H 17/04; E04H 17/06; E04H 17/161; E04H 17/18; F16B 7/048; F16B 7/22; F16C 11/04; F16C 11/405; F16C 11/045; Y10T 403/32131; Y10T 403/32139; Y10T 403/32147; Y10T 403/32155; Y10T 403/71; Y10T 403/7105
USPC ...... 256/25, 26, 27; 403/68, 69, 70, 71, 384, 403/385
See application file for complete search history.

(56) References Cited

U.S. PATENT DOCUMENTS

| | | | | |
|---|---|---|---|---|
| 1,749,001 A | * | 3/1930 | Scheeler | E04H 17/18 256/1 |
| 4,506,408 A | * | 3/1985 | Brown | E05D 5/12 16/225 |
| 5,632,066 A | * | 5/1997 | Huong | G06F 1/1616 403/68 |
| 8,024,839 B2 | * | 9/2011 | Lewis, II | E05D 11/105 16/266 |
| 9,563,236 B2 | * | 2/2017 | Rittenhouse | G06F 1/1618 |
| 9,964,988 B2 | * | 5/2018 | Rittenhouse | E05D 3/12 |
| 10,738,425 B2 | * | 8/2020 | Heselden | E04H 17/161 |
| 2006/0038165 A1 | * | 2/2006 | Larsen | E04H 17/161 256/32 |
| 2010/0058688 A1 | * | 3/2010 | Goddard | E04H 17/161 52/238.1 |
| 2014/0168928 A1 | * | 6/2014 | Lee | H01R 35/02 361/809 |
| 2019/0226230 A1 | * | 7/2019 | Langenwalter | E04H 17/161 |

FOREIGN PATENT DOCUMENTS

| | | | | |
|---|---|---|---|---|
| DE | 2824746 A1 | * | 12/1979 | ........... E04H 17/161 |
| DE | 202011100030 U1 | * | 7/2011 | ........... E04H 17/161 |
| FR | 2786518 A1 | * | 6/2000 | ............. E06B 11/04 |
| KR | 100530803 B1 | * | 11/2005 | ........... E04H 17/161 |

* cited by examiner

*Primary Examiner* — Josh Skroupa
(74) *Attorney, Agent, or Firm* — Tumey L.L.P.

(57) ABSTRACT

A connector for pivotably connecting two structural members together includes a generally planar member having a plurality of semi-circular tabs extending from the planar member. The tabs are semi-circular to pivotably receive a vertically extending rod member of one of the structural elements. The connector may include a semi-cylindrical wall portion that is adapted to receive and capture a horizontally extending rod member of one of the structural members.

7 Claims, 8 Drawing Sheets

PIVOT CONNECTOR

BACKGROUND OF THE INVENTION

Field of the Invention

This invention relates to a pivot connector for pivotably connecting two structural elements together. The elements may be similar in construction or dissimilar.

Description of Related Art

Currently pivot connectors can be complicated and consist of several parts which need to be assembled. Also when assembly of structural elements in the field is required it is frequently difficult to handle the structural elements and the pivot connector together because of the several parts of the pivot connected.

There is a need for a simple, reliable connector that is easy to attach to multiple structural members.

BRIEF SUMMARY OF SOME OF THE PREFERRED EMBODIMENTS

These and other needs in the art are addressed in one embodiment of the invention that includes a first generally planar member having a pair of semi-cylindrical tabs that are adapted to be secured to one of the structural elements without a mechanical fastener. This allows the structural element to pivot with respect to a second structural element.

The foregoing has outlined rather broadly the features and technical advantages of the present invention in order that the detailed description of the invention that follows may be better understood. Additional features and advantages of the invention will be described hereinafter that form the subject of the claims of the invention. It should be appreciated by those skilled in the art that the conception and the specific embodiments disclosed may be readily utilized as a basis for modifying or designing other embodiments for carrying out the same purposes of the present invention. It should also be realized by those skilled in the art that such equivalent embodiments do not depart from the spirit and scope of the invention as set forth in the appended claims.

BRIEF DESCRIPTION OF THE DRAWINGS

For a detailed description of the preferred embodiments of the invention, reference will now be made to the accompanying drawings in which.

DETAILED DESCRIPTION OF THE PREFERRED EMBODIMENTS

Figure 1:
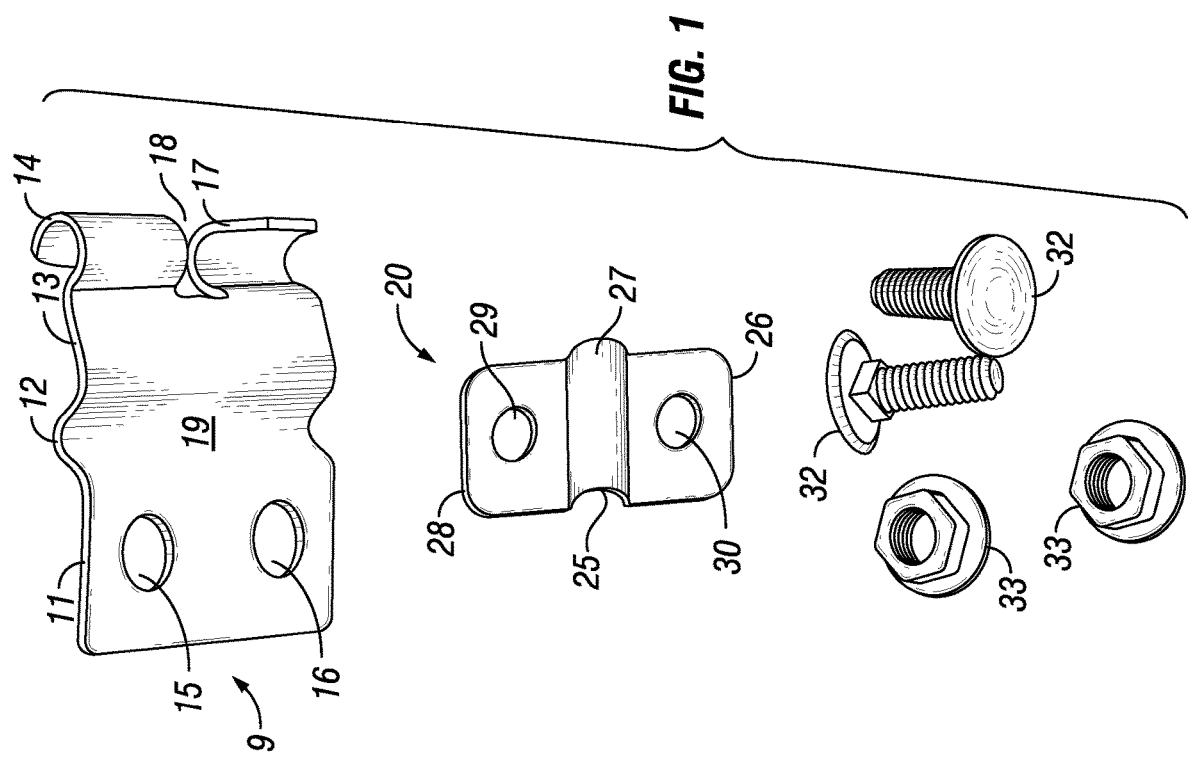
FIG. 1 is an exploded view of a pivot connector according to a first embodiment of the invention.

FIG. 1 illustrates an embodiment of the invention which includes a first piece having two generally planar members 11 and 13 that are formed together by a semi-circular wall portion 12 thereby forming a groove 19. Member 11 included two apertures 15 and 16. Planar member 13 includes a pair of tabs 14, 17 that are formed as semi-cylindrical tabs. Tabs 14 and 17 are spaced by a gap 18 shown in FIG. 2. Tabs 14 and 17 are open in opposite directions. However they may open in the same direction.

The pivot connector 9 includes a second piece 20 having two generally planar portions 28 and 26 that are connected together by a semi-circular wall portion 27 which forms a second groove 25. Planar portion 28 has an aperture 29 and planar portion 26 has an aperture 30 which are adapted to align with apertures 15 and 16 respectfully when assembled.

Figure 3:
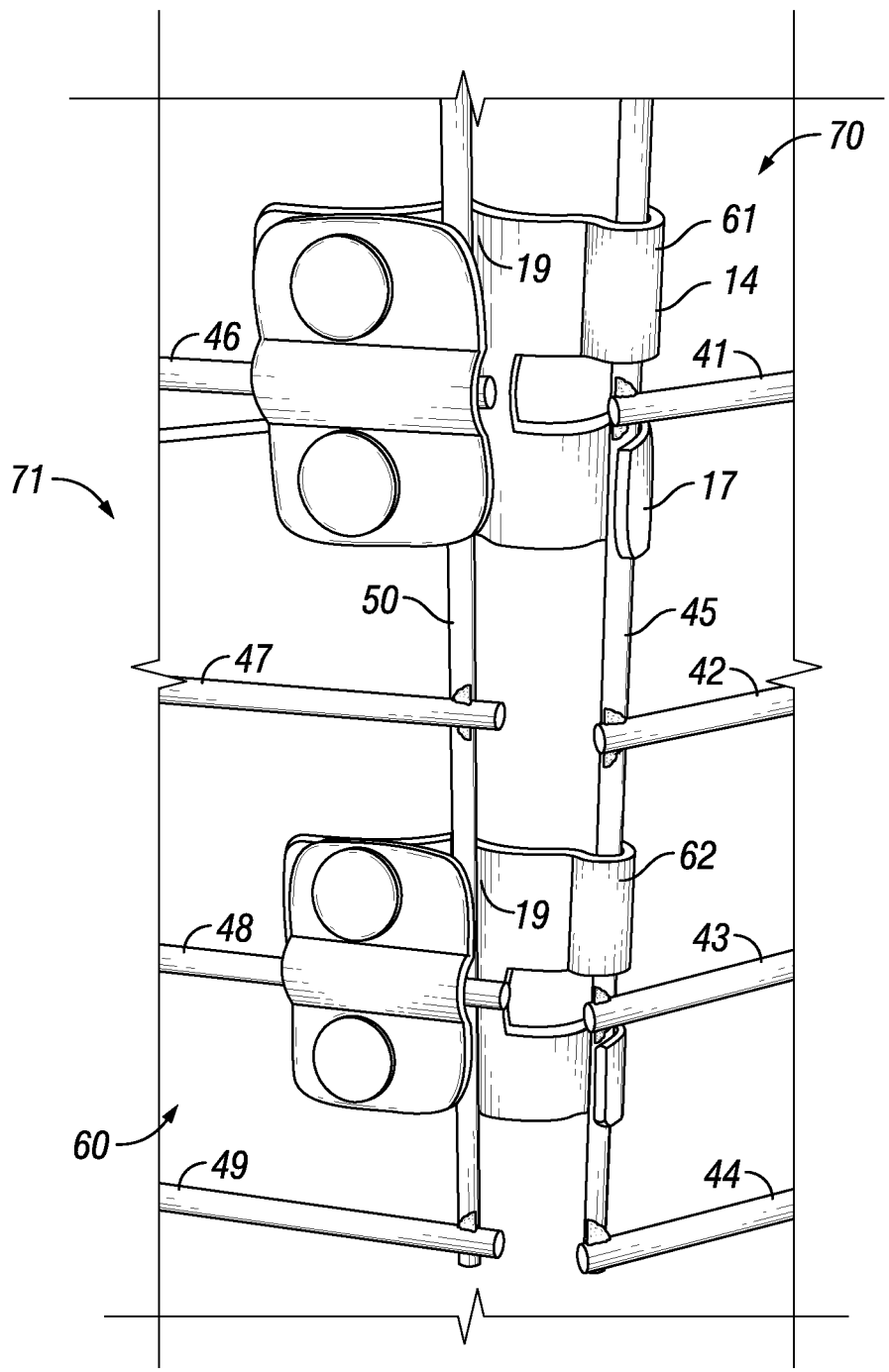
FIG. 3 is a perspective view of the embodiment of FIG. 1 connecting two structural elements that are alike.

FIG. 3 illustrates a manner in which two similar structured elements 60 and 70 can be connected together.

Structural elements 60 and 70 for example are fence panels that each included a plurality of vertically extending wire or rods such as 50, 45 that are connected to a plurality of horizontally extending wires or rods 41-44, or 46-49, thus forming an open rod structural member.

To pivotably connect the two panels together as shown in FIG. 3, panel 70 is rotated 90° such that rod 41 is aligned with gap 18 in upper connector 61 and then inserted to the gap or vice versa. Panel 70 can then be rotated such that vertical rod 45 is positioned within tabs 14 and 17. Lower connector 62 is positioned about rod 45 in a similar manner.

Figure 2:
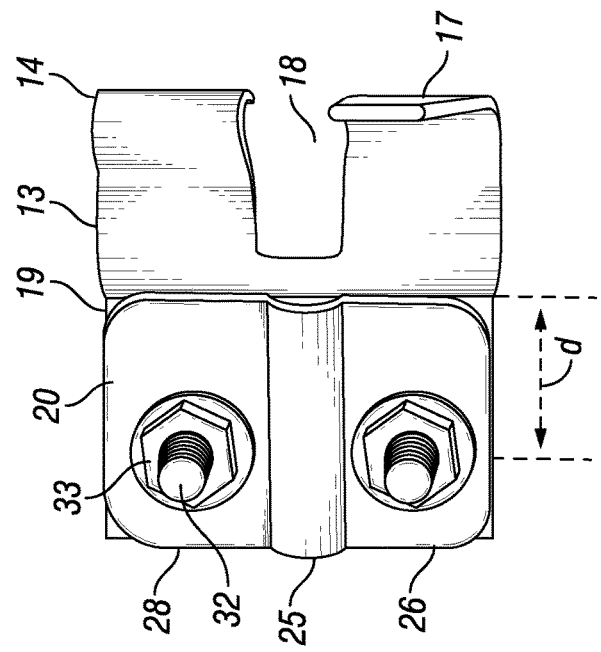
FIG. 2 is a perspective view of the embodiment of FIG. 1.

Next rod 50 of the second panel is positioned within grove 19 of upper and lower connectors 61 and 62. The second piece 20 is then positioned to overly portion 11 with groove 27 securing rod 46 of the panel member as shown in FIG. 3. Bolts 32 and nuts 33 secure the two pieces of the connector together such that rods 46 and 48 are captured within groove 27. Dimension "d" in FIG. 2 is selected such that right portion of connector piece 20 overlies groove 19 such that rod 50 is captured in groove 19. The same procedure is used to connected lower connector 62. Panels 60 and 70 are now pivotably connected to each other.

Figure 4:
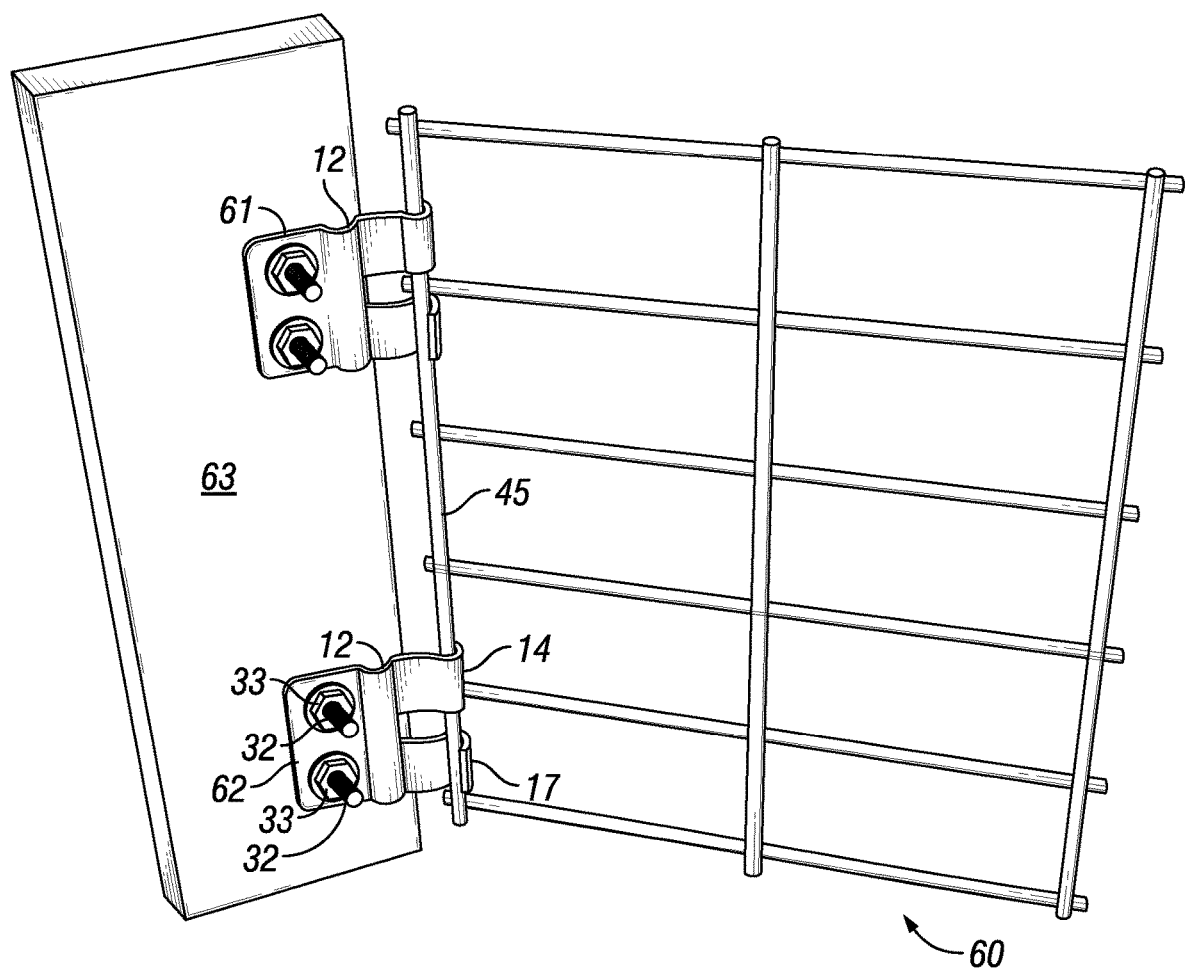
FIG. 4 is a rear perspective view of the embodiment of FIG. 1 connecting two dissimilar elements together.

FIG. 4 illustrated a second embodiment of the invention wherein the panel 60 is connected to a solid member 63 such as a post. In this embodiment second piece 20 of the connector is not required. The groove 12 is constructed so as to extend outwardly of member 63. Bolts 32 extend through member 63 and cooperate with nuts 33 to secure the connector to member 63. Connectors 61, 62 are first maneuvered so that rod 45 is positioned between the tabs 14 and 17.

Figure 5:
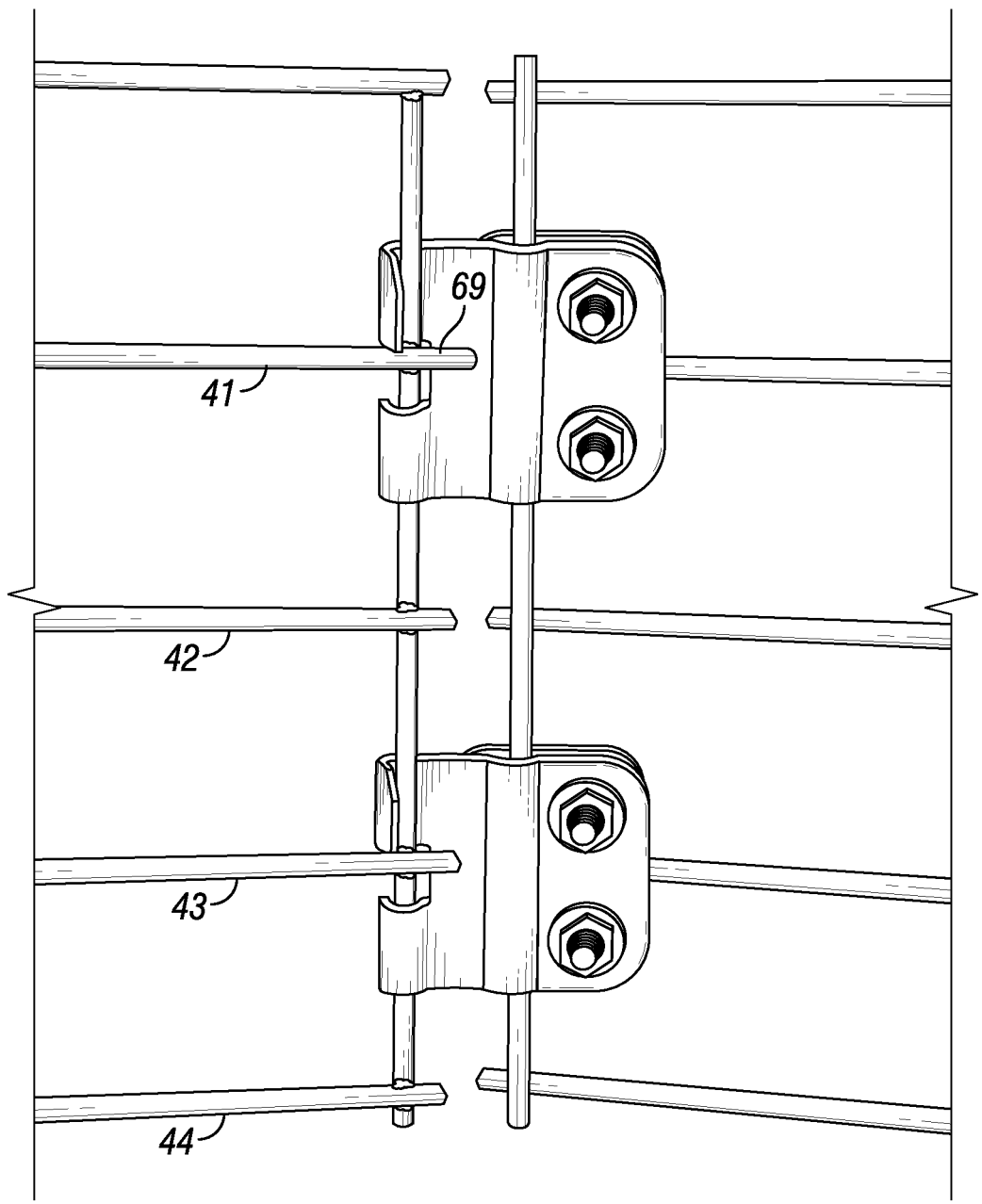
FIG. 5 is a view showing the end of a rod being blocked by a portion of the connector.

The depth of gap 18 shown in FIG. 2 is such that the connected panels can rotate about 330° with respect to each other. However the depth can be made less so an end portion 69 of the rods 41-44 will abut a solid portion of connector portion 13 so as to limit rotation of the panels with respect to each other as shown in FIG. 5. Also portions 11 and 13 can be angled with respect to each other to change the limit position of the panels.

Figure 6:
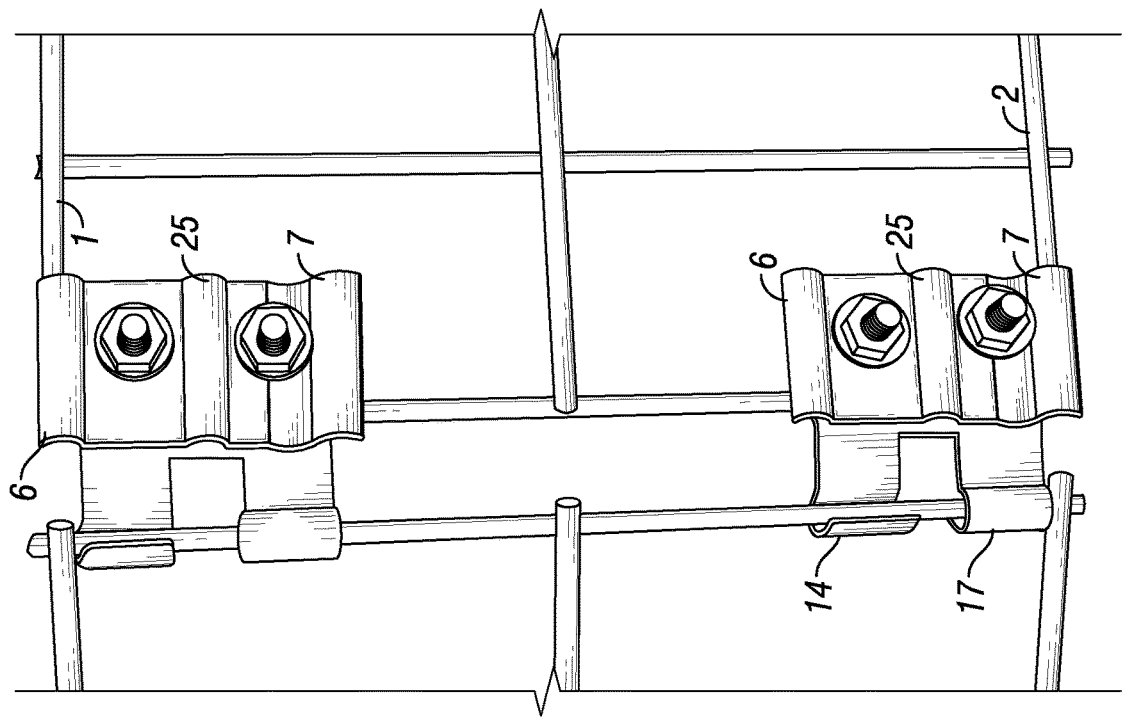
FIG. 6 is a perspective view of another embodiment of the invention connecting two similar structural members.

A further embodiment of the pivot connector is shown in FIG. 6 wherein second piece 20 of the connector includes upper and lower groove members 6 and 7 which can overlap either top rod members of the panels or bottom rod members 2 of the panels as shown in FIG. 6. In this embodiment planar portion 11 of the connector includes a tab extending from its top and bottom portion to overlie horizontal rods 1 or 2 when connected.

Figure 7:
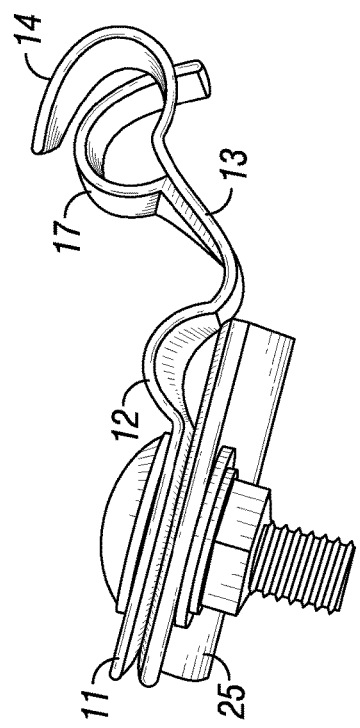
FIG. 7 is a top view of an additional embodiment of the invention.

A further embodiment of the connector is shown in FIG. 7. In this embodiment planar portions 11 and 13 are not positioned in the same plane but rather are angled with respect to each other.

Figure 8:
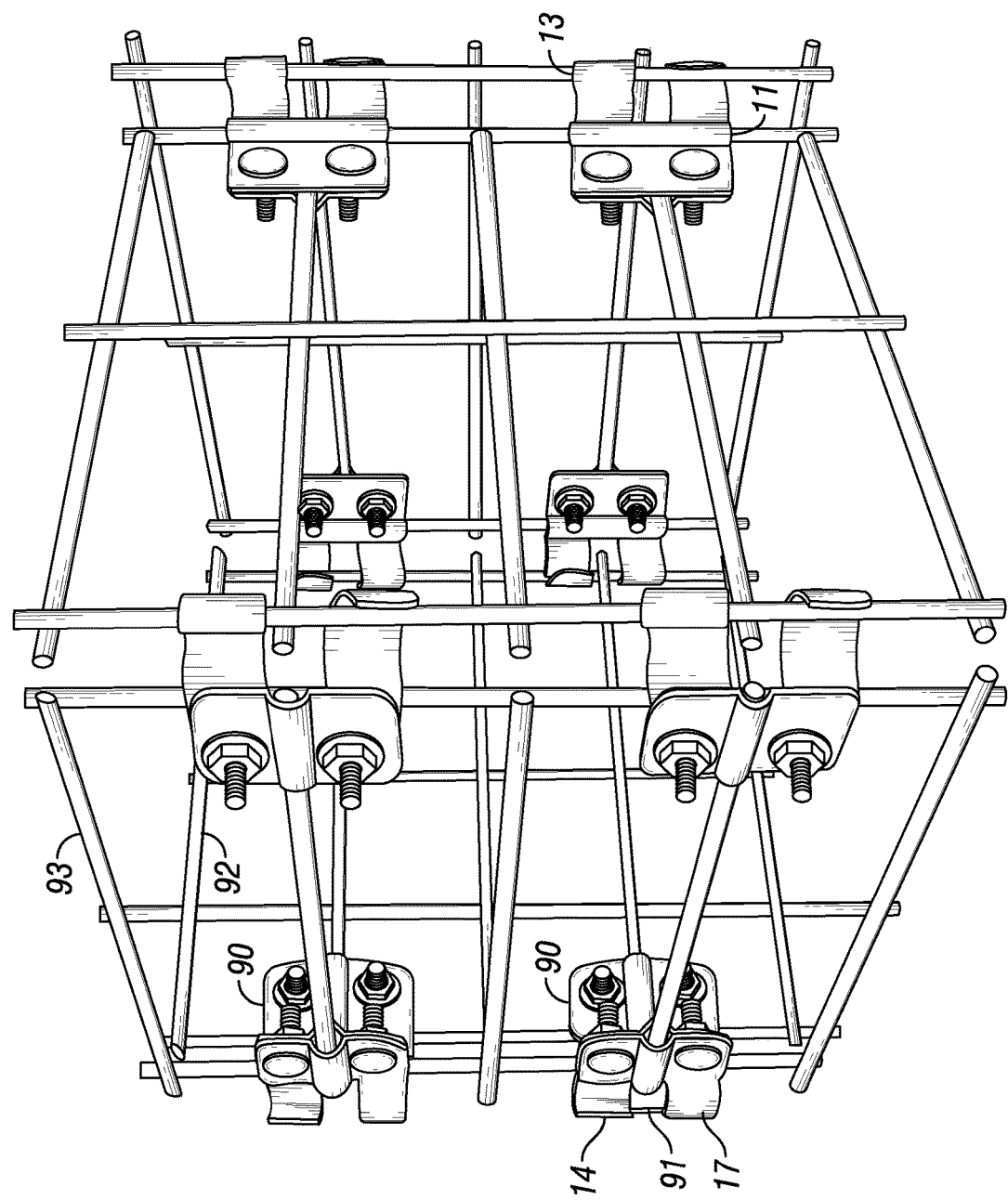
FIG. 8 is a perspective view of an enclosure utilizing the invention.
Figure 9:
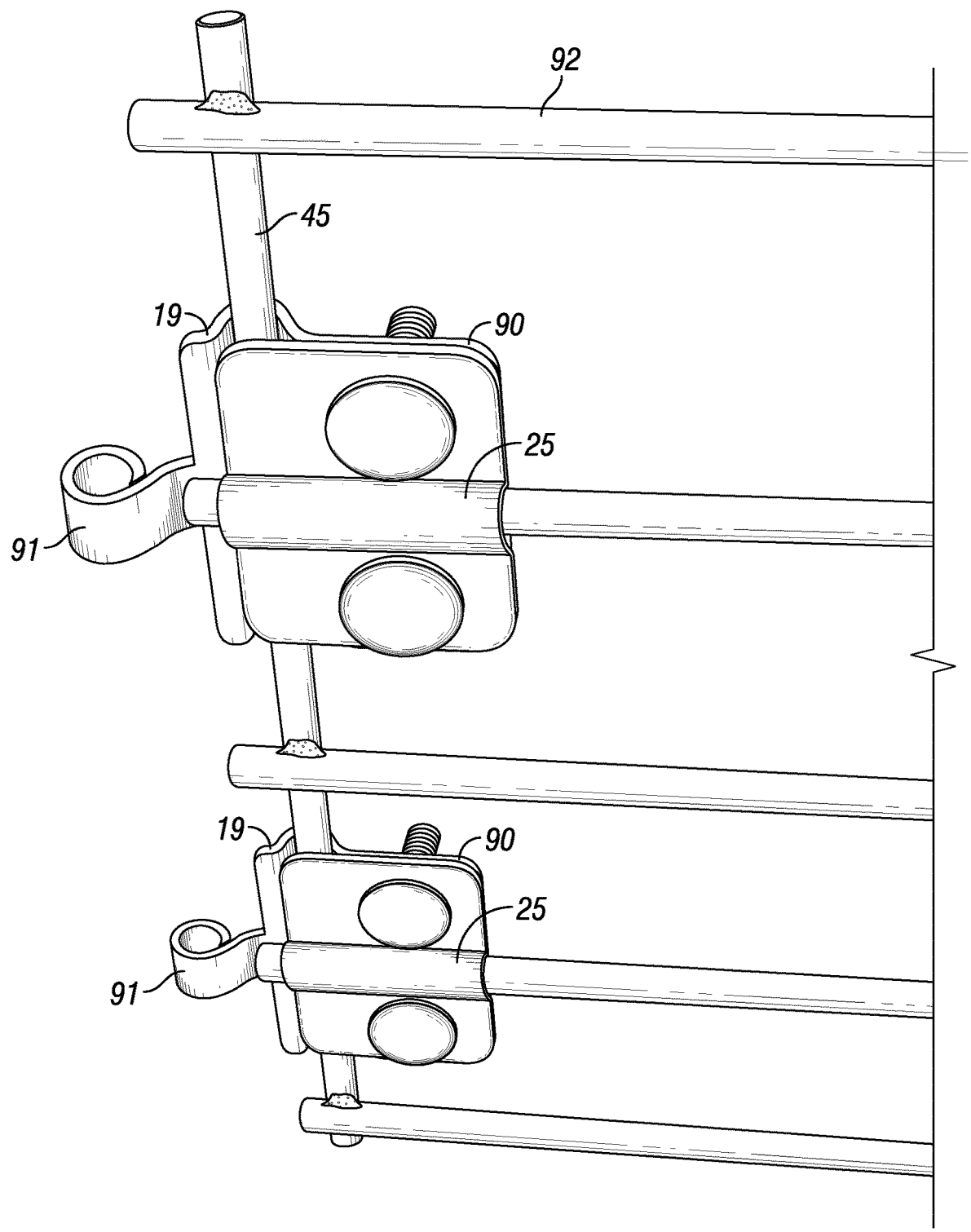
FIG. 9 is a perspective view of a modified connector for an enclosure.

The connector of FIG. 7 can be used to connect plural panels together in a line or in a geometric relationship as shown for example in FIG. 8. The panels can be folded on top of each other in a flat orientation. In order to form an enclosure, two panels can be secured to each other by a link 90 as shown in FIG. 9. Links 90 includes a single full circle tab 91 that fits into slot 18 as shown in FIG. 9 such that a locking pin can be placed through taps 14, 17, and 91 to secure panel sections 92, 93 to each other. A groove 19 captures rod 45 while a groove 25 captures a horizontal rod.

Figure 10:
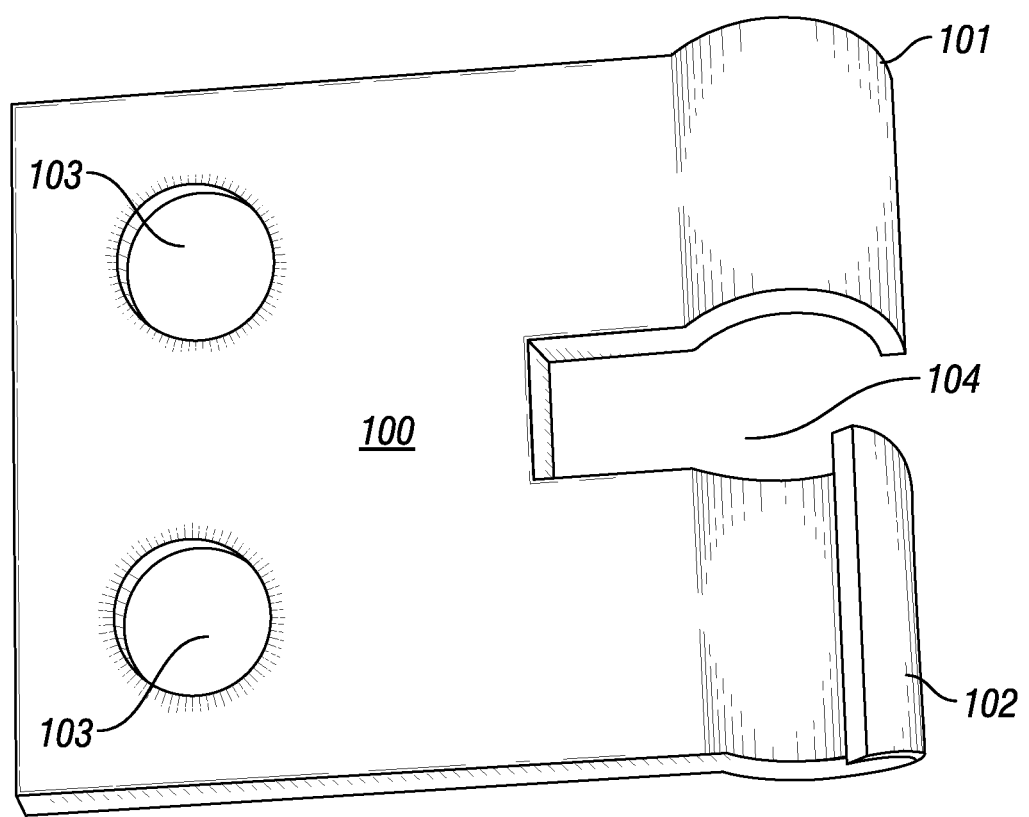
FIG. 10 is a perspective view of a further embodiment of the invention.

A further embodiment of the invention is shown in FIG. 10. This is similar to the embodiment of FIG. 4 but lacks the central curved wall portion 12. The connector includes a planar member 100 having tab portion 101 and 102 extending from a first side. The tabs are spaced by a gap 104. Tabs 101 and 102 have semi-circular configuration and are open in opposite directions. Planar member 100 also includes one or more apertures 103 for a fastener device to secure the connector to another structural member such as a post.

Although the present invention and its advantages have been described in detail, it should be understood that various changes, substitutions and alterations may be made herein without departing from the spirit and scope of the invention as defined by the appended claims.

What is claimed is:

1. A connector for pivotably attaching an open rod structural member to another structural member comprising:
   a) a first planar piece having two generally planar sections joined together by a semi-circular wall portion,
   b) a plurality of semi-cylindrical tabs, spaced by a gap, extending from one of the generally planar sections and adapted to receive a rod associated with the open rod structural member,
   c) a second piece having two planar portions that are connected together by a semi-circular wall portion, a longitudinal axis of the semi-circular wall portion of the second piece being perpendicular to a longitudinal axis of the semi-circular wall portion of the first piece.

2. The connector of claim 1 wherein the other of said generally planar section includes at least one aperture for receiving a securing element for securing the connector to another structural element.

3. The connector of claim 1 wherein the two generally planar sections lie in the same plane.

4. The connector of claim 1 wherein the semi-circular wall portion of the first piece is adapted to capture a vertically extending rod of a second open rod structural member and the semi-circular wall portion of the second piece of the connector is adapted to capture a horizontally extending rod of the second open rod structural member.

5. The connector of claim 1 wherein the depth of the gap is dimensioned such planar members partially blocks rotation of the rod structural member by engaging an end portion of a horizontally extending rod of the open rod structural member.

6. An enclosure formed by a plurality of open rod structure having a plurality of vertically and horizontally extending rods, and a plurality of connectors that connect the open rod structures together, each connector comprising;
   a) a first planar piece having two generally planar sections joined together by a semi-circular wall portion,
   b) a plurality of semi-cylindrical tabs, spaced by a gap, extending from one of the generally planar sections and adapted to receive a rod associated with the open rod structural member,
   c) a second piece having two planar portions that are connected together by a semi-circular wall portion, a longitudinal axis of the semi-circular wall portion of the second piece being perpendicular to a longitudinal axis of the semi-circular wall portion of the first piece.

7. An enclosure as claimed in claim 6 wherein the two generally planar sections are angled with respect to each other whereby the open rod structure can be folded flat on one another.

* * * * *